INVENTOR.
ROBERT D. MAURER
BY Clarence R. Patty, Jr.
ATTORNEY

United States Patent Office

3,270,290
Patented August 30, 1966

3,270,290
NEODYMIUM GLASS LASER HAVING AN OUTPUT AT ABOUT 9180 A.
Robert D. Maurer, Painted Post, N.Y., assignor to Corning Glass Works, Corning, N.Y., a corporation of New York
Filed Oct. 19, 1962, Ser. No. 231,790
5 Claims. (Cl. 331—94.5)

This invention relates to optical masers and more particularly to an optical maser employing trivalent neodymium as the active ion and producing amplification over a range of about 80 A. centered near 9180 A.

Optical masers employing the trivalent neodymium ion have previously been constructed which produce amplification near 10,600 A.; however, it is believed that, due to the substantially lower energy corresponding to the transition which produces amplification around 9180 A., such amplification was not obtained prior to the present invention.

Accordingly, it is an object of the present invention to provide an optical maser capable of amplifying radiations of approximately 9180 A. in length.

A further object is to provide a method for amplifying radiations of wave lengths corresponding to transitions having optical cross sections smaller than those of other transitions within a maser system.

These and other objects, which will be apparent from the description, are accomplished in general by providing the active component of an optical maser with means for confining within the resonator radiations corresponding to the said transitions having smaller optical cross sections while permitting the escape of radiations characterized by larger optical cross sections and in particular by utilizing such means to permit the amplification of radiations corresponding to transitions between previously unutilized energy levels within the trivalent neodymium ion.

Figure 1:
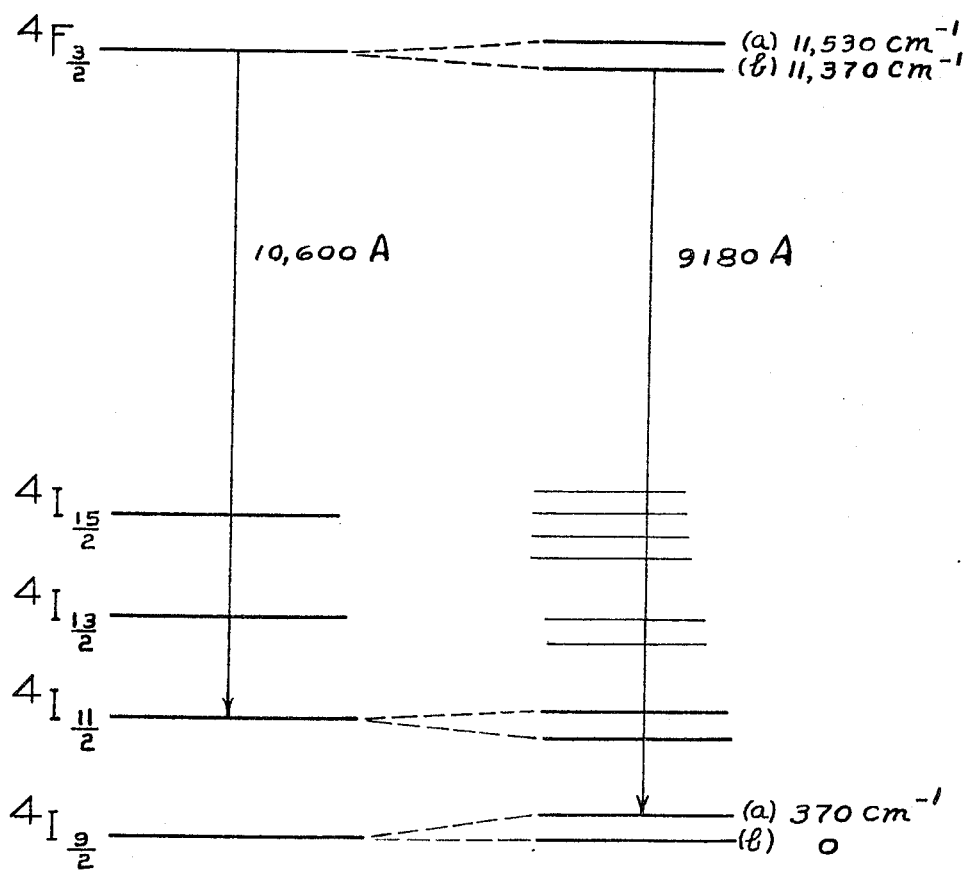
Figure 2:
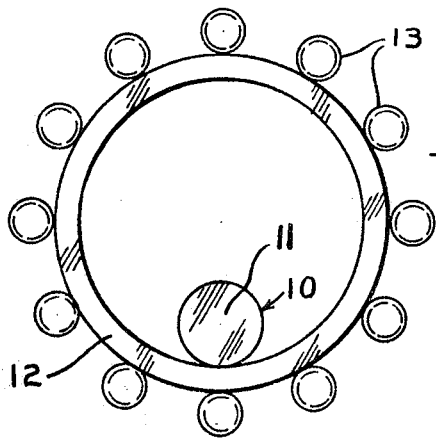

The invention will be described with reference to the accompanying drawing, in which:

FIG. 1 is a diagram showing the energy levels of the trivalent neodymium ion, and FIG. 2 is an end elevational view of an optical maser according to the invention.

The behavior of an optical maser can be deduced from the processes occurring between two quantum states of a system under irradiation. These states may be designated by 1 for the higher energy state and 2 for the lower, and $n_1$ and $n_2$ may be used to represent the number of atoms per unit volume in each quantum state. Further, let I represent the intensity of radiation of energy $h\nu$ corresponding to the energy of separation of the two states, where $h$ is Planck's constant and $\nu$ is the frequency of the radiation. In traversing a distance $dx$ of the system, incident radiation may be coherently diminished (absorption) by raising atoms in the state 2 to state 1. This process is described by the equation $$dI \text{ (absorption)} = -In_2\sigma dx$$

where the minus sign designates the diminution of amount $dI$, and $\sigma$ is an optical cross section characteristic of the process, the quantity $n_2\sigma$ being the optical absorption coefficient. In addition, atoms in the upper state can drop to the lower state and coherently amplify the incident intensity. This process is described by the equation $$dI \text{ (amplification)} = -In_1\sigma dx$$

with the same cross section, $\sigma$, as for absorption. The net change of intensity for the incident radiation is then $$dI = I(n_1 - n_2)\sigma dx$$

Therefore, if net amplification is to be achieved, it is necessary to have $n_1 > n_2$. If state 2 is an amount $\Delta E$ in energy above the lowest state of the system, then $n_2$ will be proportional to the factor $\exp.-\Delta E/kT$, where $k$ is Boltzman's constant and T the absolute temperature. Therefore, reducing the temperature may considerably reduce $n_2$ and increase the ease of attaining amplification.

The left-hand side of FIG. 1 illustrates the energy levels of the trivalent neodymium ion which are sensibly the same regardless of what glass or crystal the ion is dissolved in. Heretofore, optical maser action with neodymium has been obtained with states $^4F_{3/2}$ and $^4I_{11/2}$ (corresponding, respectively, to states 1 and 2 in the discussion above). See: Snitzer, Physical Review Letters, vol. 7, No. 12, pp. 444–446. The present invention comprises a new optical maser using components of states $^4F_{3/2}$ and $^4I_{9/2}$. The new maser utilizes the fact that the energy levels of the neodymium ion are further subdivided on a finer scale ("split") as shown by the right-hand side of FIG. 1. These additional levels result from interaction with surrounding atoms and hence depend in detail upon the glass or crystal in which the neodymium ion is dissolved—the energy values in FIG. 1 being those for the particular glass used in demonstration of the device as described below. The two states used in the present device are the $^4F_{3/2}(b)$ and $^4I_{9/2}(a)$ levels, corresponding respectively to levels 1 and 2 in the explanation above and having energy levels expressible, respectively, as 11,370 cm.$^{-1}$ and 370 cm.$^{-1}$. From the energy levels shown, it can be deduced that cooling the maser below room temperature will be materially helpful in reducing $n_2$, although this is not necessary if $n_1$ can be made correspondingly greater.

The optical cross section for the transition in the previously demonstrated optical masers using neodymium and operating at 10,600 A. is greater than that for the transition in the present optical maser, which operates at 9180 A. Therefore, light energy at 10,600 A., corresponding to the separation of the $^4F_{3/2}$ and $^4I_{11/2}$ levels, is amplified more than light of the energy corresponding to the separation of the $^4F_{3/2}(b)$ and $^4I_{9/2}(a)$ levels in the present optical maser. Thus, the atoms in the $^4F_{3/2}$ state will be used to amplify a light frequency which for the purpose of the present invention is undesirable. This situation is corrected according to the invention by building an optical resonator with two parallel ends having dielectric coatings constructed to transmit light of the undesirable frequency, and hence eleminate it from the resonator, while reflecting light of the desired frequency. In this way the amplification of the $^4F_{3/2}-^4I_{11/2}$ transition is suppressed.

A greater number of atoms in the upper quantum state ($n_1 > n_2$) is effected by absorbing light corresponding to frequencies with energies $h\nu$ greater than the separation of the lowest level and the $^4F_{3/2}$ level. There are several levels of the neodymium ion above the $^4F_{3/2}$ level that are capable of absorbing these frequencies. These levels are represented by the lines above the $^4F_{3/2}$ level of FIG. 1. The system drops from these levels to the $^4F_{3/2}$ level in a time which is short compared to the time it will remain in the $^4F_{3/2}(b)$ level.

An optical maser according to the invention was made from a glass containing by weight approximately: 70% $SiO_2$, 15% $Na_2O$, 12% $CaO$, 1% $Al_2O_3$, 0.5% $Sb_2O$ and 1.5% $Nd_2O_3$. A cylindrical glass rod 10 having a diameter of 0.48 cm. and a length of 5.2 cm. was prepared with ends flat to one-tenth of a wavelength and parallel to six seconds of arc. Next, a dielectric coating was applied to each end by alternately evaporating layers of zinc sulfide and magnesium fluoride. These materials were placed in a Speedivac Coating Unit (Model 19E6), equipped with a Modulated Light Source Photometer (Model 1A), manufactured by Edwards High Vacuum, Ltd. The photometer was equipped with a filter to read the reflectance of the coating at 9180 A. First one of the materials was evaporated until a maximum reflectance was obtained; then the other was evaporated until another maximum reflectance was obtained—alternate layers were thus deposited until the desired reflectance was measured. The final coating 11 had transmissions at $0.92\mu$ and $1.06\mu$, respectively, of $<1\%$ and $>60\%$ for one end and $<2\%$ and $>80\%$ for the other.

Rod 10 was suspended in a clear dewar tube 12 which had inner and outer diameters of 6.7 mm. and 15 mm., respectively, and which was surrounded by 10 Edgerton Germeshausen and Grier Model 100 flash tubes 13, as shown in FIG. 2. Nitrogen gas which passed through a copper coil immersed in liquid nitrogen and then through the clear dewar was used to lower the temperature of the optical maser to 80° K. A capacitor bank of 160 $\mu f.$, which could be charged to as high as 3.8 kv., was discharged through the xenon flash tubes. Absorption of light from the flash tubes excited the neodymium atoms to the $^4F_{3/2}(b)$ state. Light from the optical maser was passed through a grating monochromator with a resolution of 64 A. and detected with a photomultiplier. Above threshold energy, the photomultiplier output gave a series of sharp "spike-like" oscillations on an oscilloscope trace. At 80° K., the threshold electrical energy was 700 joules, and at energies 50% above threshold, the coherent amplification spread over a range of about 80 A. centered near 9180 A.

The precise wave lengths of the radiation amplified by the present optical maser will vary with the composition of the glass or crystal in which the neodymium ion is dissolved. Composition variations will produce varying degrees of splitting of the energy levels illustrated in FIG. 1, and the result will be that amplified radiation will be centered about wavelengths varying by approximately $\pm 100$ A. from the 9180 A. value observed in the above example. Lowering the temperature of the device, although helpful in reducing $n_2$, is not essential.

It will be understood that the described dielectric coating may be varied by those skilled in the art according to the types of radiation desired to be transmitted and reflected, and that such coatings may be applied in all forms of masers for producing selective resonance at desired frequencies while inhibiting resonance at other frequencies, thereby producing amplification of radiation at only the desired frequencies.

Accordingly, it is intended that the present invention be limited not by the example given in the description, but rather by only the scope of the appended claims.

What is claimed is:

1. Means for producing amplification of electromagnetic radiations having wavelengths of approximately 9180 A., which comprises an active component comprising a glass containing trivalent neodymium ions, means for irradiating said component, said component being provided with a reflecting coating, said coating having a substantially lower reflectivity for radiations around 10,600 A. than for radiations around 9180 A.

2. Means according to claim 1 which includes means for lowering the temperature of said active component.

3. A laser having an output at a wavelength within the range approximately 9080–9280 A., which laser comprises an active element comprising a glass containing trivalent neodymium ions, means for irradiating said active element, and reflecting means for reflecting back within said active element radiation which would otherwise escape therefrom, said reflecting means having a maximum reflectivity at said wavelength within the range approximately 9080–9280 A.

4. A laser having an output at a wavelength of approximately 9180 A., which laser comprises an active element comprising a glass containing trivalent neodymium ions, means for irradiating said active element, and reflecting means for reflecting back within the said active element radiation which would otherwise escape therefrom, said reflecting means having a maximum reflectivity at a wavelength of approximately 9180 A.

5. A laser having an output at a wavelength within the range approximately 9080–9280 A., which laser comprises an active element comprising a glass containing trivalent neodymium ions, means for irradiating said active element, and reflecting means for reflecting back within said element radiation which would otherwise escape therefrom, said reflecting means having a substantially lower reflectivity for other radiation emitted from said active element than for radiation having said wavelength within a range 9080–9280 A.

References Cited by the Examiner

Heavens: "Optical Properties of Thin Solid Films," Butterworth Publications, London 1955, pages 224, 225, and 227.

Johnson et al.: "Infrared Fluorescence and Stimulated Emission of $Nd^{+3}$ in $CaWO_4$," Proc. IRE, vol. 49, No. 11, November 1961, pages 1704–06.

McLung et al.: "$R_2$ Line Optical Maser Action in Ruby," Journal of Applied Physics, vol. 33, No. 10, October 1962, pages 3139 and 3140.

McClung et al.: "Optical Maser Action in the $R_2$ Line of Ruby," Bull. Amer. Phys. Soc., vol. 6, Sec. II, page 511, abstract No. 12.

Schawlow et al.: "Simultaneous Optical Maser Action in Two Ruby Satellite Lines," Physical Review Letters, vol. 6, No. 3, Feb. 1, 1961, pages 96 to 98.

Snitzer: "Optical Maser Action of $Nd^{+3}$ in a Barium Crown Glass," Physical Review Letters, vol. 7, No. 12, Dec. 15, 1961, pages 444 to 446.

White et al. "Continuous Gas Maser Operation in the Visible," Proc. of the IRE, vol. 50, No. 7, July 1962, page 1697.

JEWELL H. PEDERSEN, *Primary Examiner.*

J. L. CHASKIN, *Assistant Examiner.*